W. W. WYGAL & C. L. BURGESS.
BUTTER MAKING PROCESS.
APPLICATION FILED MAR. 9, 1908.
930,713.  Patented Aug. 10, 1909.
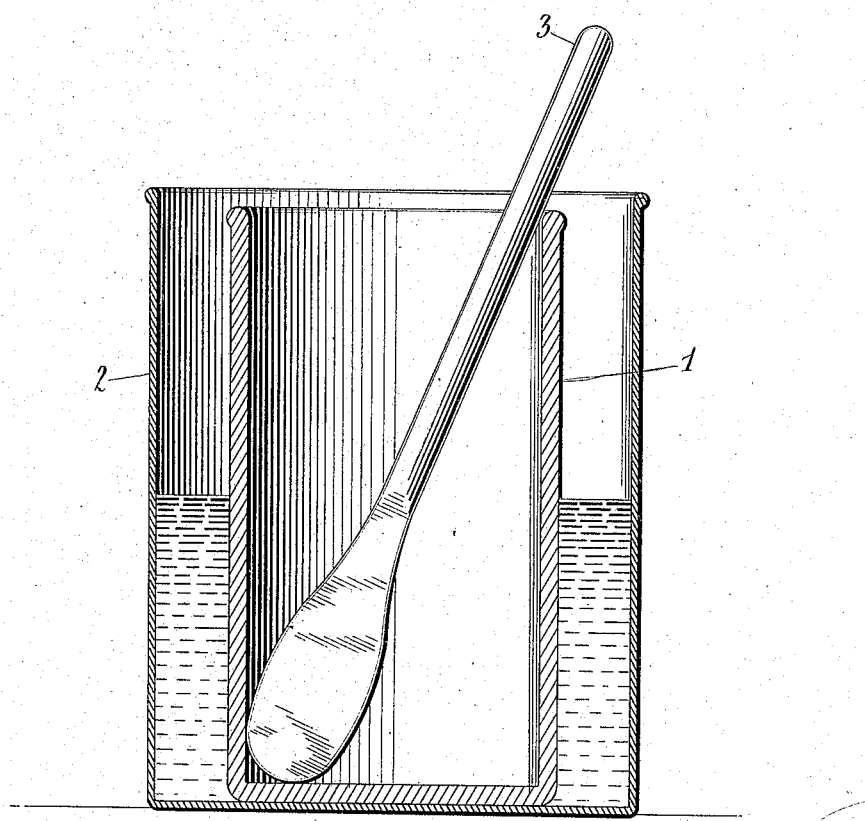
Witnesses
Inventors
William W. Wygal and
Calvin L. Burgess
Attorneys

UNITED STATES PATENT OFFICE.

WILLIAM W. WYGAL AND CALVIN L. BURGESS, OF BLUEFIELD, WEST VIRGINIA, ASSIGNORS TO BENJAMIN N. HAWES, OF WASHINGTON, DISTRICT OF COLUMBIA.

BUTTER-MAKING PROCESS.

No. 930,713.     Specification of Letters Patent.     Patented Aug. 10, 1909.

Application filed March 9, 1908. Serial No. 420,027.

*To all whom it may concern:*

Be it known that we, WILLIAM W. WYGAL and CALVIN L. BURGESS, citizens of the United States, residing at Bluefield, in the county of Mercer, State of West Virginia, have invented certain new and useful Improvements in Butter-Making Processes; and we do hereby declare the following to be a full, clear, and exact description of the invention, such as will enable others skilled in the art to which it appertains to make and use the same.

The present invention relates to improvements in the manufacture of butter, and it aims to devise a butter-making process which is characterized by extreme simplicity and which may be put into operation without necessitating the use of any specifically constructed apparatus.

The process will be fully described hereinafter and will be readily understood from such description when considered in connection with the accompanying drawing wherein is shown a vertical sectional view of one form of the apparatus used in carrying out the process.

The apparatus above referred to comprises an inner receptacle 1, preferably a stone or earthen ware crock, and a metal outer receptacle 2 within which the first mentioned receptacle is placed. The relative diameters of the two receptacles are such that when the inner receptacle 1 is properly positioned, its walls are spaced an appreciable distance at all points from the wall of the outer receptacle, as shown.

In carrying out the process, the receptacle 2 is filled to approximately half its extent with water heated to a temperature varying from 95° to 130° F. In said receptacle is placed the crock 1 in which have been previously deposited a pound of fresh butter cut into small slices, and a pint of sweet rich milk or cream. This mixture is then stirred by a paddle or similar implement 3, until it is reduced by the heat of the water which surrounds the walls of the crock, to a homogeneous plastic mass, such operation continuing from fifteen to twenty minutes. At the conclusion of the operation, the mass is poured into molds of any preferred size and shape and thereafter cooled.

It will be apparent from the foregoing that the process is one of extreme simplicity, and that it necessitates the use of no special apparatus whatever and of no foreign substances, differing in these respects from certain patented processes in which kettles, churns, stirrers, brine-tanks and working-tables are successively made use of, and carbonate of soda and similar substances are employed.

What is claimed is:

1. A butter-making process consisting solely in mixing together sweet milk and butter in a receptacle surrounded by water at a temperature varying from 95° to 130° F. until the mixture is reduced to a homogeneous plastic mass, and in thereafter cooling the mass in molds.

2. The process of producing a food product, consisting in placing a quantity of butter in a quantity of milk and simultaneously subjecting the mass to the action of heat, whereby through the medium of the milk, the butter is brought to the proper condition for emulsification with the milk, upon agitation of the entire mass.

In testimony whereof, we affix our signatures in presence of two witnesses.

WILLIAM W. WYGAL.
                 CALVIN L. BURGESS.

Witnesses:
    J. W. HILTON,
    ROBT. C. LAFFERTY.